Dec. 8, 1931. A. E. LIDDERDALE 1,835,067
FISHING TOOL
Filed Nov. 8, 1930    2 Sheets-Sheet 1

INVENTOR
Arthur E. Lidderdale
By Green & McCallister
His Attorneys

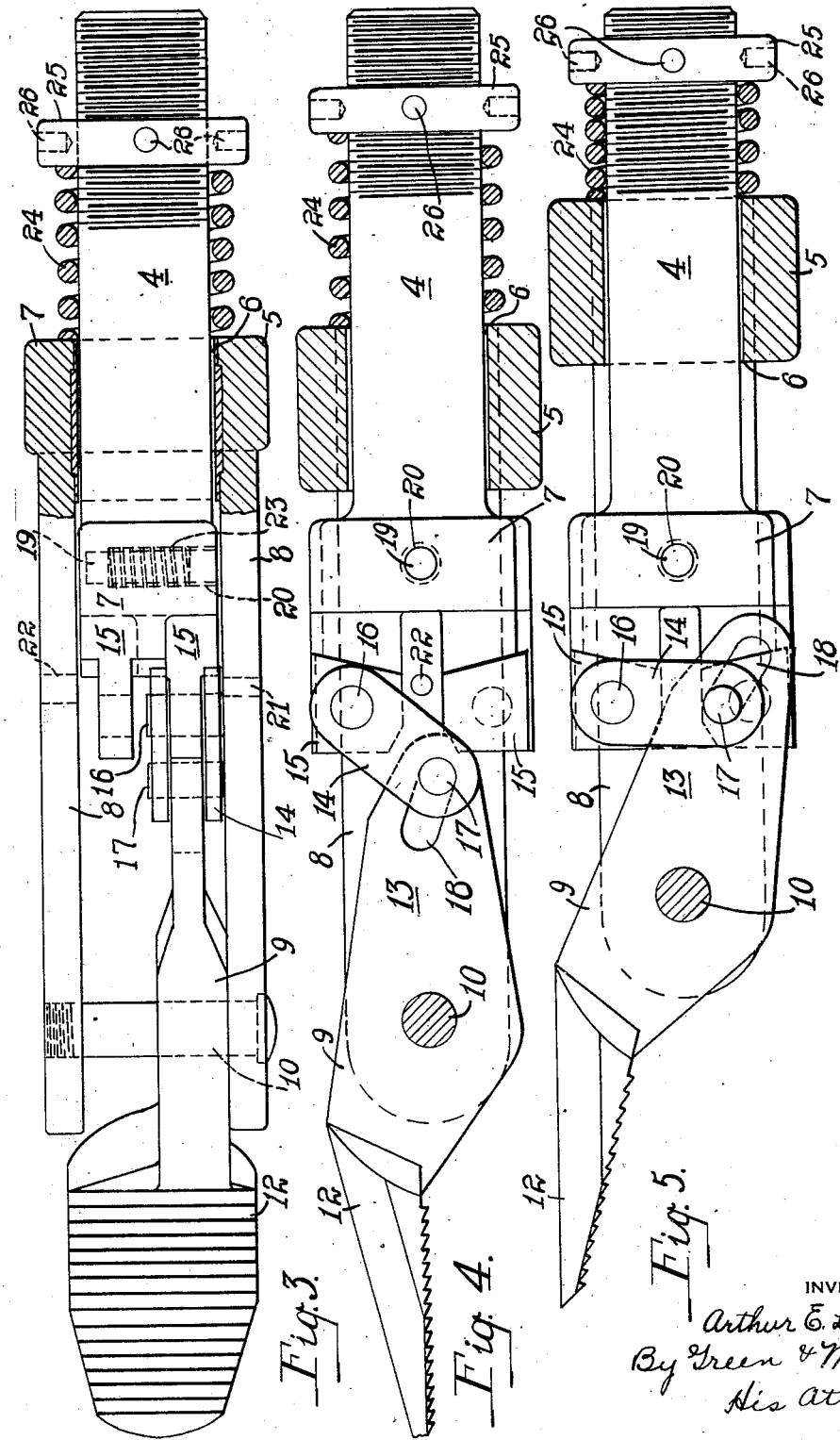

Patented Dec. 8, 1931

1,835,067

UNITED STATES PATENT OFFICE

ARTHUR E. LIDDERDALE, OF CASPER, WYOMING, ASSIGNOR TO SPANG AND COMPANY, OF BUTLER, PENNSYLVANIA, A CORPORATION OF PENNSYLVANIA

FISHING TOOL

Application filed November 8, 1930. Serial No. 494,313.

This invention relates to fishing tools and more particularly to improvements in fishing tools of the grab type.

An object of this invention is to provide a tool for raising objects in which the grip of the jaws increases as the object is being raised.

Another object of this invention is to provide a tool for raising objects, in which the gripping members are held in open position until coming in engagement with the object to be raised.

A further object of this invention is to provide a tool for raising objects in which the gripping members are positively forced into engagement with the object to be raised.

A still further object of this invention is to provide a fishing tool which is rugged in construction, simple to manufacture and positive in operation.

These and other objects which will be readily apparent to those skilled in this particular art are accomplished by means of this invention, which is hereinafter described and one embodiment of which is illustrated in the accompanying drawings, wherein;

Fig. 3 is a view in partial side elevation having parts cut away and parts in section for clearness.

Fig. 4 is a view taken at right angles to Fig. 3 and showing the gripping member in closed position; and Fig. 5 is a view similar to Fig. 4 showing the gripping member in open position.

Figures 1, 2:
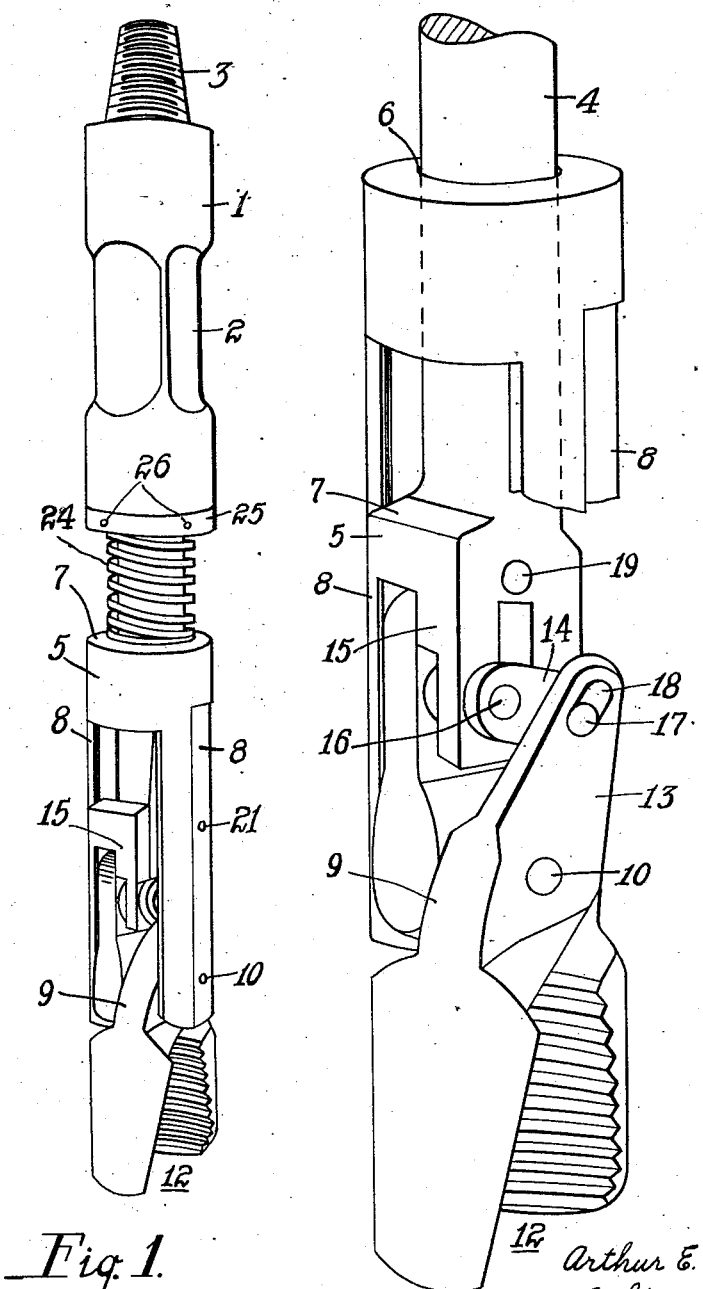
Figure 1 is a view in perspective of the fishing tool.
Fig. 2 is a partial view in perspective of the fishing tool having a portion thereof cut away.

Referring to the drawings, the fishing tool is mounted on a connection sub 1 of the usual type, having a wrench flat 2 and a threaded portion 3 for attaching the sub to a string of tools, not shown. The sub has a socket, not shown, opposite the end 3 into which a mandrel 4, forming the body of the fishing tool, is threaded. A sliding member or collar 5, having arms or prongs 8 depending therefrom, is movably mounted on the mandrel 4. The mandrel has a head portion 7 for retaining the collar 5 thereon and for limiting the downward movement thereof. The arms 8 extend from the collar below the mandrel head on opposite sides thereof, and have gripping members 9 pivotally supported therebetween on a pin 10 which extends through openings in the arms. The gripping members have gripping jaws 12 on the ends thereof which extend below the arms 8 for engaging the object to be raised.

The upper end 13 of each gripping member is connected by a link 14 to a lug 15, which projects downwardly from the mandrel head 7. One end of the link is pivotally mounted on a pin 16, secured to the lug while the opposite end of the link is provided with a pin 17 which extends through a slot 18 in the end 13 of the gripping member. The pin and slot joint between the link and gripping member forms a cam action connection in which the pin 17 is equivalent to a cam and the slot 18 is the follower for the cam. This cam action will be hereinafter explained. The linkage connection between the lug 15 and the end 13 of the gripping member is such that on forcing the collar 5 upwardly on the mandrel 4, the gripping members will turn on the pin 10 and cause the gripping jaws to be spread apart.

To maintain the gripping jaws in open position, I provide a pin 19, which is mounted in an openng 20 extending through the mandrel head. The arms 8 are provided with openings 21—22, which register with the opening 19 when the collar 5 is in its upper position on the mandrel, so that the pin 19 may be pushed into the opening 22. A spring member 23 secured to the pin 19 retains the pin in its normal position in the mandrel head. When the pin 19 has been inserted into the opening 22 in the arms 8 of the collar 5, the tension of the spring 23 tends to withdraw the pin therefrom. To overcome the tension of the spring 23, a spring member 24 is placed on the mandrel 4 which forces the collar 5 downwardly so that the friction between the arm 8 and the pin 19 will prevent the spring 23 from withdrawing the pin from the opening 22. To increase or decrease the tension of the spring member 24, a nut 25 is threaded on the mandrel 4. The nut is provided with opening 26 for receiving a spanner wrench for loosening or tightening the nut.

To operate the fishing tool, the tension nut 25 is loosened and the collar 5 is forced upwardly on the mandrel 4 toward the sub 1. The collar 5 on being raised, also raises the arms 8 and the gripping members 9 pivoted therebetween on the pin 10, which causes each of the pins 17 on each of the links 14 to slide in the slots 18 in the ends 13 of gripping members until it engages the lower portion of the slot which forces the gripping members to turn on the pin and spread the gripping jaws 12. The collar 5 is forced upwardly until the openings 21 and 22 in the arms 8 register with the opening 20 in the mandrel head and while in registration, the pin 19 is forced against the tension of the spring 23 into the opening 22 by an instrument inserted through the opening 21.

To overcome the force set up by the contracting of the spring 23 when the pin 19 is forced into the opening 22, the nut 25 is tightened, which increases the tension of the spring 24, and which forces the collar 5 downwardly so that the arm will bear against the pin 19, extending into the opening 22 therein, until the friction therebetween is sufficient to overcome the tension of the spring 23, and hold the jaws in open position. In this position, the fishing tool is lowered into the well. When the gripping jaws come into engagement with the object to be raised, the downward movement of the fishing tool is stopped and the weight of the string of tools above the fishing tool contracts the spring 24 which removes the friction between the arm 8 and the pin 19, allowing the spring 23 to withdraw the pin from the opening 22. The collar 5 is then forced downwardly on the mandrel by the spring 24. As the collar moves downwardly, the gripping members pivoted on the pin 10 extending through the arms are also moved downwardly. Since the upper ends of the gripping members are linked to fixed lugs on the mandrel head, the pin 17 on the link 14 slides in the slot 18 until the pin engages the upper portion of the slot, thereby positively forcing the jaws 12 toward each other into gripping engagement with the fish. When the fishing tool is being withdrawn from the well, the grip of the jaws 12 is increased, and since the collar 5 is pulled downwardly on the mandrel 4, the leverage of the link 14 is increased, which forces the gripping jaws closer together so they will firmly grasp the object or fish.

It is readily apparent that if it is desired to use the fishing tool with rotary or hydraulic drilling systems, water passages may be provided, not shown, through the center of the connection sub and the mandrel 4, without departing from the spirit of my invention.

While I have described one embodiment of this invention it is readily apparent that certain changes and substitutions may be made therein without departing from the spirit of this invention or the scope of the appended claims.

What I claim as new and desire to secure by Letters Patent is:

1. A fishing tool comprising a connection sub, a mandrel having a head thereon threaded into the lower end of said sub, projecting lugs on the head of said mandrel, a sliding body having arms extending therefrom mounted on said mandrel, a spring member around said mandrel above said sliding body, a nut on said mandrel for increasing or decreasing the tension of said spring, gripping members having jaws on one end thereof pivoted between the arms of said sliding body, slots in said arms opposite said jaws, links connecting said gripping members with said lugs, said links having pins on the end thereof extending through said slots, for turning said gripping members when said sliding body is raised or lowered on said mandrel and means for securing said jaws in open position, including a spring tension pin in said mandrel adapted to engage an opening in the arms of said sliding body.

2. A fishing tool comprising a connection sub, a mandrel, lugs projecting from the head of said mandrel, a collar adapted to slide on said mandrel and having arms extending therefrom below said mandrel, gripping members pivoted in said arms, having jaws on one end and slots in the other end thereof, links connecting said gripping members with said lugs and having pins slidable in said slots for causing the gripping jaws to open and close when said collar is moved up and down on said mandrel, and means for yieldingly locking said jaws in open position, said means including a spring retained pin mounted in said mandrel adapted to be received in an opening in one of said arms when said collar is in its upper position on the mandrel, a spring member on said mandrel above said collar for frictionally holding said spring retained pin in the opening in said arm, and means for increasing or decreasing the tension of said spring member.

3. A fishing tool comprising a connection sub, a mandrel having a head thereon connected to said sub, lugs projecting from said mandrel, a collar adapted to slide on said mandrel between the head thereof and said sub, arms depending from said collar, gripping jaws pivotally mounted within said arms, means for yieldingly maintaining said collar in its lower position on said mandrel to hold said jaws in their closed position, means connecting said lugs and said jaws for opening said jaws when said collar is raised on said mandrel and means for yieldingly maintaining said jaws in open position.

4. A fishing tool comprising a mandrel having lugs projecting from the head thereof, a collar slidably mounted on said mandrel and having integral arms depending therefrom, gripping members pivotally mounted in said arms, link members connecting said lugs with said gripping members, means yieldingly mounted in said mandrel for maintaining said gripping members in open position, and means for forcing said gripping members on engagement with a fish on releasing said locking means.

5. A fishing tool comprising a mandrel having a head thereon, lugs extending from said head member, a member slidably mounted on said mandrel and provided with arms extending therefrom, gripping members pivotally mounted in said arms having slots in the ends opposite the gripping jaws, links for connecting said lugs and said gripping members, said links being disposed so that on movement of said sliding member upwardly and downwardly on said mandrel the gripping members are opened and closed respectively, means for maintaining said gripping members in open position, and means for closing said gripping members when in engagement with a fish.

6. A fishing tool comprising a connection sub, a mandrel having a head thereon, lugs extending from said head member, a member slidably mounted on said mandrel and provided with arms extending downwardly therefrom, gripping members pivotally mounted in said arms having jaws on one end and slots on the other end thereof, links connecting said lugs and said gripping members, said links being so disposed that on movement of said sliding member upwardly and downwardly on said mandrel, the gripping members are turned about the pivot on said arms to open and close the jaws thereof respectively, a spring retained member disposed in an opening in said mandrel adapted to be pressed into engagement with an opening in the arms of said sliding member when in one of said positions for maintaining said grippng jaws in open position, and a spring member on said mandrel for forcing the arm of said sliding member against said spring retained member.

7. A fishing tool comprising a mandrel having a head thereon, a lug extending from said head member, a member slidably mounted on said mandrel and provided with arms extending downwardly therefrom, a gripping member pivotally mounted in said arms, a link connecting said lug and said gripping members, said link having a pin on one end thereof slidably disposed in a slot in said gripping member so that on movement of said sliding member upwardly and downwardly on said mandrel the gripping member is opened and closed respectively, and a spring member on said mandrel for returning said sliding member to its lower position thereon for closing said gripping members.

8. A fishing tool comprising a connection sub, a mandrel having a head thereon, lugs on the end of said mandrel, a collar adapted to slide on said mandrel between the head and said sub, arms depending from said collar, gripping members pivoted within said arms, said gripping members having gripping jaws on one end thereof and slots in the opposite end, links connecting said lugs with the slots in said gripping members, said links being adapted to turn said gripping members within said arms when the collar is moved on said mandrel, means for locking said collar in upper position on said mandrel, said means including apertures in said arms adapted to register with an opening through said mandrel, a spring retained member mounted in the opening in said mandrel adapted to be pushed into the aperture in said arms, and means on said mandrel for frictionally holding said spring retained member in said aperture.

9. A fishing tool comprising a connection sub, a mandrel having a head thereon, lugs projecting from the head of said mandrel, a collar member slidably mounted around said mandrel, and having prongs depending therefrom, gripping members pivoted within said arms, each of said gripping members having a jaw on one end and a slot on the other end thereof, a link connecting each of said lugs with each of said gripping members, said link having a pin slidable in said slot imparting a cam action thereto for opening and closing said jaws on movement of said collar and arms, a spring retained member in said mandrel adapted to be forced into an aperture in one of said arms for maintaining said collar in one position on said mandrel and means on said mandrel for frictionally holding said spring retained member in said aperture until the gripping members have engaged a fish.

10. A fishing tool comprising a connection sub, a mandrel, lugs on said mandrel, a collar member slidably mounted around said mandrel, arm depending from said collar on opposite sides of said mandrel, gripping members pivoted within said arms, each of said gripping members having a gripping jaw on the lower end and a slot in the upper end thereof, a link connecting each of said lugs with each of said gripping members, said links having pins slidably mounted in said slots for inparting a cam action to said gripping members, a spring retained member mounted in an opening in said mandrel adapted to be pushed into an aperture in one of said arms for maintaining said collar in its upper position on said mandrel, and a spring member on said mandrel adapted to bear against said collar for holding said spring retained member in said aperture until said gripping members engage a fish.

11. The combination in a fishing tool, of a body member, a collar slidably mounted on said body member, arms depending from said slidable collar, jaw members pivotally secured between said depending arms, cam connections between said jaw members and said body member, and means associated with said body member for frictionally maintaining said jaw members in open position.

12. The combination in a fishing tool, of a mandrel, a member slidably mounted on said mandrel and having integrally formed arms depending therefrom, gripping members pivotally secured to said arms, cam members connecting said gripping members to said mandrel, means for frictionally locking said sliding member to said mandrel to hold said gripping members in open position, and means for forcing said gripping members into engagement with the fish on release of said locking means.

13. The combination in a fishing tool, of a mandrel, a collar slidably mounted on said mandrel and having arms extending therefrom, gripping members hingedly connected to said arms, cam members connecting said gripping members to said mandrel, means for locking said collar in fixed relation to said mandrel so as to maintain said gripping members in open position, means for withdrawing said locking means when said gripping members are in engagement with the fish, and means for forcing said slidable collar downwardly relative to said mandrel for forcing said gripping members to firmly grasp said fish.

14. In a fishing tool, a body member, a collar slidably mounted thereon and having prongs depending therefrom, jaw members hingedly mounted on said arms and pivotally connected to said body member, means for locking said collar to said body member so as to hold said jaw members in open position and means for frictionally holding said locking means in locking engagement with said collar.

In testimony whereof, I have hereunto subscribed my name this 14th day of October, 1930.

ARTHUR E. LIDDERDALE.